(12) United States Patent
Nagahama et al.

(10) Patent No.: US 7,430,441 B2
(45) Date of Patent: Sep. 30, 2008

(54) HANDSFREE COMMUNICATION CONTROL METHOD, PORTABLE RADIO COMMUNICATION APPARATUS AND HANDSFREE SYSTEM

(75) Inventors: Kentaro Nagahama, Kodaira (JP); Toshiya Tamura, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 796 days.

(21) Appl. No.: 10/946,529

(22) Filed: Sep. 20, 2004

(65) Prior Publication Data

US 2005/0070338 A1 Mar. 31, 2005

(30) Foreign Application Priority Data

Sep. 30, 2003 (JP) ............................. 2003-342563

(51) Int. Cl.
*H04M 1/00* (2006.01)
(52) U.S. Cl. ................. 455/569.1; 455/569.2; 455/41.2
(58) Field of Classification Search .............. 455/569.1, 455/575.2, 575.6, 556.1, 41.2, 41.3
See application file for complete search history.

(56) References Cited

U.S. PATENT DOCUMENTS

| 5,175,759 | A | 12/1992 | Metroka et al. |
| 5,557,653 | A | 9/1996 | Paterson et al. |
| 5,596,638 | A | 1/1997 | Paterson et al. |
| 5,794,163 | A | 8/1998 | Paterson et al. |
| 6,615,059 | B1 | 9/2003 | Pehrsson et al. |
| 7,120,474 | B1 * | 10/2006 | Sharp .................... 455/575.1 |
| 2002/0111140 | A1 | 8/2002 | Kim |
| 2003/0045235 | A1 | 3/2003 | Mooney et al. |
| 2004/0204161 | A1 * | 10/2004 | Yamato et al. .......... 455/569.1 |

FOREIGN PATENT DOCUMENTS

| CN | 1369166 A | 9/2002 |
| EP | 1 199 867 A1 | 4/2002 |
| JP | 2002-125037 A | 4/2002 |
| JP | 2002-290538 A | 10/2002 |
| JP | 2002-300648 A | 10/2002 |
| JP | 2003-47066 A | 2/2003 |
| WO | WO 0045566 | 8/2000 |

OTHER PUBLICATIONS

"Specification of the Bluetooch System; Profiles, Version 1.1; Part K;6; Headset Profile" Specificaiton of the Bluetooth System, Feb. 22, 2001, pp. 197-226, XP002277008.
Bluetooth Hands-Free Profile Application Guideline, CCAP, Jun. 20, 2003, title page and p. 87.

* cited by examiner

*Primary Examiner*—Edward Urban
*Assistant Examiner*—Christian A Hannon
(74) *Attorney, Agent, or Firm*—Frishauf, Holtz, Goodman & Chick, P.C.

(57) ABSTRACT

A channel disconnection detecting unit detects whether a voice channel is disconnected by an AG or by an HF. When the voice channel is disconnected by the AG, an AG control unit controls a modulation/demodulation unit to maintain a connection of the AG with a BS and a switching unit switches a voice signal to an AG speaker and an AG microphone. When the voice channel is disconnected by the HF, the AG control unit controls the modulation/demodulation unit to interrupt the connection of the AG with the BS.

9 Claims, 6 Drawing Sheets

HANDSFREE COMMUNICATION CONTROL METHOD, PORTABLE RADIO COMMUNICATION APPARATUS AND HANDSFREE SYSTEM

CROSS-REFERENCE TO RELATED APPLICATIONS

This application is based upon and claims the benefit of priority from prior Japanese Patent Application No. 2003-342563, filed Sep. 30, 2003, the entire contents of which are incorporated herein by reference.

BACKGROUND OF THE INVENTION

1. Field of the Invention

The present invention relates to a handsfree communication control method, a portable radio communication apparatus and a handsfree system, which are capable of appropriately maintaining or interrupting a connection of a portable radio communication apparatus with a mobile communication network when a handsfree short-range communication link is disconnected during a handsfree phone conversation using the portable radio communication apparatus in, for example, an automobile.

2. Description of the Related Art

A communication procedure for making a handsfree phone conversation through a portable radio communication apparatus in an automobile is defined as a handsfree profile (hereinafter referred to as HFP). According to the HFP, the portable radio communication apparatus is connected to a car-installed handsfree apparatus through a short-range communication means (e.g., short-range radio communication such as Bluetooth™) to configure a handsfree system, thereby allowing a handsfree phone conversation in an automobile through a mobile communication network. When a link using the short-range communication means (hereinafter referred to as a short-range communication link) is suddenly disconnected during a handsfree phone conversation (hereinafeter referred to as link loss), the portable radio communication apparatus is automatically disconnected from the mobile communication network unless the short-range communication link is connected again within a predetermined period of time.

However, the HFP does not define whether the short-range communication link is disconnected by a normal procedure or a with link loss with no procedures when, for example, the engine of an automobile is stopped. The short-range communication link can thus be disconnected by a normal procedure according to the design specifications of the handsfree apparatus. Furthermore, the HFP does not define whether a connection of the portable radio communication apparatus with the mobile communication network is maintained or interrupted when the short-range communication link is disconnected by a normal procedure. This connection is therefore maintained or interrupted according to the design specifications of the portable radio communication apparatus.

In view of the above, a user thinks that the portable radio communication apparatus is automatically disconnected from the mobile communication network if the user stops the engine of his or her automobile. Actually, however, the connection can possibly be continued and so can be accounting therefor. On the other hand, even though a user wishes to continue a phone conversation using a portable radio communication apparatus after he or she stops the engine of his or her automobile, the apparatus can possibly be disconnected regardless of the user's intention.

For example, Jpn. Pat. Appln. KOKAI Publication No. 2002-300648 discloses a conventional handsfree apparatus that controls a connection between a portable radio communication apparatus and a mobile communication network by monitoring a status of a short-range communication link associated with the portable radio communication apparatus (see page 2 and FIG. 1). The conventional handsfree apparatus has a function of monitoring the status of the short-range communication link to prevent calling and charging from continuing by methods of displaying an alarm, invalidating an input operation, disconnecting the apparatus from the mobile communication network, etc. when the status of the link is not good.

However, the above conventional handsfree apparatus has the problem that the maintenance or interruption of a connection of the portable radio communication apparatus with the mobile communication network cannot properly be controlled with user's intention when the short-range communication link is disconnected.

Accordingly, it is an object of the present invention to provide a handsfree communication control method, a portable radio communication apparatus and a handsfree system, which are capable of appropriately maintaining or interrupting a connection of a portable radio communication apparatus with a mobile communication network when a short-range communication link is disconnected.

BRIEF SUMMARY OF THE INVENTION

According to one aspect of the present invention, there is provided a handsfree communication control method, characterized by comprising setting a voice channel and a data channel by short-range communication means between a handsfree apparatus and a portable radio communication apparatus connected to a mobile communication network to allow a handsfree voice phone conversation using the voice channel; and maintaining a connection of the portable radio communication apparatus with the mobile communication network when the portable radio communication apparatus detects that the voice channel is disconnected by operation means.

DETAILED DESCRIPTION OF THE INVENTION

Embodiments of the present invention will now be described with reference to the accompanying drawings.

First Embodiment

Figure 1A:
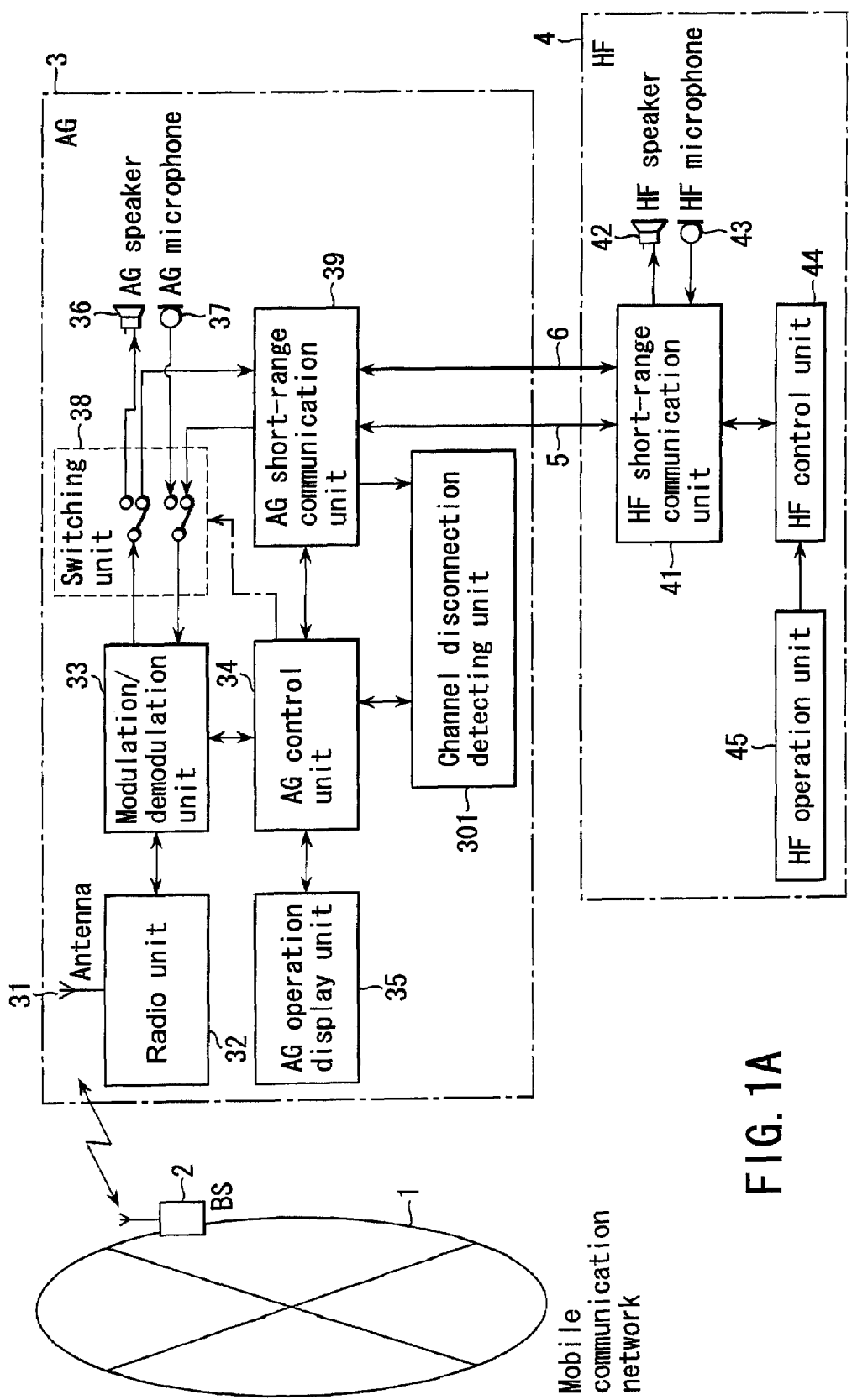
FIGS. 1A and 1B are block diagrams of a handsfree system according to a first embodiment of the present invention, showing a configuration in which a voice channel is not set and a configuration in which it is set.
Figure 1B:
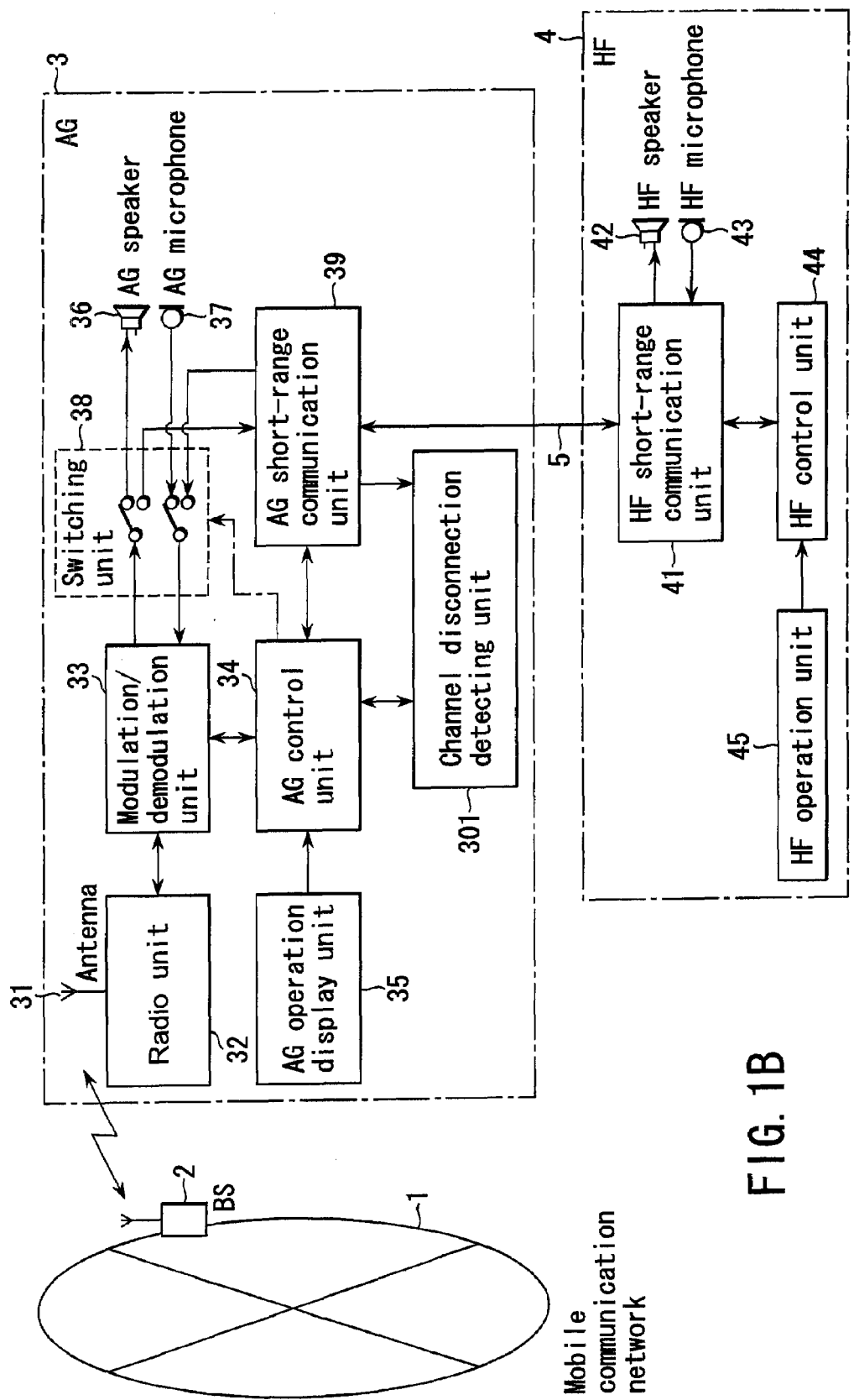

A handsfree system according to a first embodiment of the present invention will now be described with reference to FIGS. 1A and 1B. FIG. 1A is a block diagram showing a configuration of the handsfree system as well as a mobile communication network. FIG. 1B is a block diagram showing a configuration of the handsfree system whose connection is modified according to its own operation.

In FIGS. 1A and 1B, reference numeral 1 indicates a mobile communication network that offers public service, and reference numeral 2 shows a base station belonging to the mobile communication network 1. In the first embodiment, the base station is referred to as BS 2 for the sake of convenience, but it is not the only one base station. Reference numeral 3 denotes a portable radio communication apparatus (audio gateway that is referred to as AG hereinafter) such as a portable radiotelephone that configures the handsfree system, and reference numeral 4 represents a handsfree apparatus (referred to as HF hereinafter) that also configures the handsfree system to input/output voice.

The internal structure of the AG 3 will now be described. The AG 3 performs radio communication with the BS 2 via an antenna 31, a radio unit 32 and a modulation/demodulation unit 33. An AG control unit 34 controls setting of connection with the BS 2, maintenance or interruption of the connection, setting of a short-range communication link with the HF 4, maintenance or interruption of a connection with the HF 4, a shift of phone conversation to the HF 4, and the like. An AG operation display unit 35 serves to perform input and display operations of the AG 3.

An AG speaker 36 and an AG microphone 37 each function as a user interface when the AG 3 is used for a phone conversation. A switching unit 38 is provided between the modulation/demodulation unit 33 and the AG speaker 36 and AG microphone 37 to switch a voice signal according to which of the AG3 and HF4 is used for a phone conversation. The AG control unit 34 controls the switching of the switching unit 38. An AG short-range communication unit 39 configures a short-range communication means (e.g., Bluetooth) together with the HF 4 and has a function necessary for short-range communication such as modulation and demodulation. If the short-range communication means is a radio link, it also serves as a radio unit and an antenna.

A channel disconnection detecting unit 301 receives information from the AG short-range communication unit 39 to detect that a channel on the short-range communication link between the AG 3 and HF 4 is disconnected. Concurrently with this, the unit 301 also receives information from the AG control unit 34 to detect whether the channel is disconnected by the AG 3 or by the HF 4.

In FIGS. 1A and 1B, a voice coding/decoding function can be provided on the right side of the switching unit 38 or the left side thereof. The voice coding/decoding function on the left side may be included in the modulation/demodulation unit 33. The voice coding/decoding function on the right side may be included in the AG speaker 36 and AG microphone 37. This function should appropriately be designed in conformity with a suitable configuration of the AG short-range communication unit 39 and thus omitted from FIGS. 1A and 1B for the sake of brevity.

The following is a description of the internal structure of the HF 4. An HF short-range communication unit 41 configures a short-range communication means that faces the AG short-range communication unit 39 of the AG 3. The HF short-range communication unit 41 has the same function as that of the AG short-range communication unit 39. After a short-range communication link is established between the units 39 and 41, both a data channel 5 for data or control signals and a voice channel 6 can be set.

After a phone conversation is shifted to the HF 4, the HF speaker 42 and HF microphone 43 each serve as a user interface for the phone conversation. The HF control unit 44 controls, for example, a shift of the phone conversation to the HF4. An HF operation unit 45 performs the input operation of the HF 4.

Figure 2:
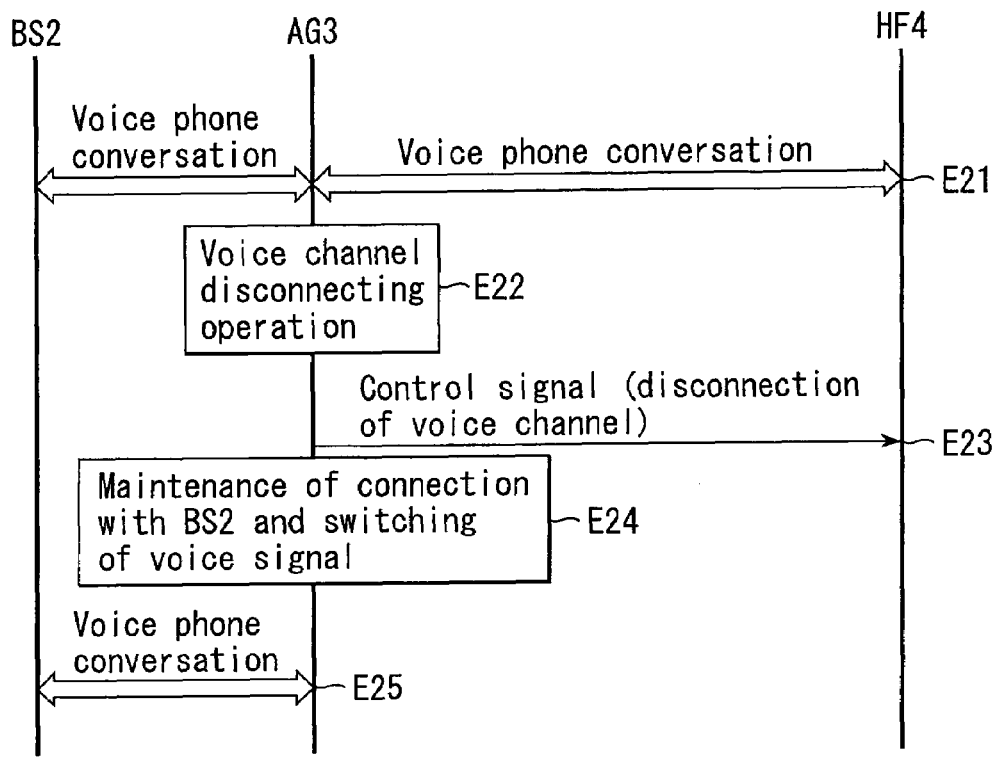
FIG. 2 is a sequence chart of an operation of the handsfree system according to the first embodiment of the present invention.

An operation of the handsfree system according to the first embodiment will now be described with reference to FIGS. 1A, 1B and 2. FIG. 2 is a sequence chart of the operation of the handsfree system. In FIG. 2, the double-headed arrows connecting lines of the BS 2, AG 3 and HF 4 indicate communication events between the BS 2, AG 3 and HF 4. The blocks on the lines of the AG 3 and HF 4 indicate their respective operation events. Assume that time elapses from top to bottom in FIG. 2.

First, assume that a handsfree voice phone conversation using the HF 4 is performed through the AG3 and BS 2 (event E21). In this case, voice is transmitted between the AG short-range communication unit 39 and HF short-range communication unit 41 through the voice channel 6, and control signals are transferred therebetween through the data channel 5 in a steady-state manner. Under these conditions, the AG operation display unit 35 performs an operation to disconnect the voice channel 6 (event E22). In response to the operation, the AG control unit 34 supplies a control signal from the AG short-range communication unit 39 to the HF short-range communication unit 41 via the data channel 5 (event E23) to disconnect the voice channel 6.

The channel disconnection detecting unit 301 detects that the AG control unit 34 disconnects the voice channel 6 in response to the operation of the AG operation display unit 35. The AG control unit 34 receives a result of the detection and controls the modulation/demodulation unit 33 to maintain a connection with the BS 2. Simultaneously, the AG control unit 34 controls the switching unit 38 to switch a voice signal and continue a voice phone conversation using the AG speaker 36 and AG microphone 37 (events E24 and E25). The fact that a user operates the AG 3 to disconnect the voice channel 6 is considered that he or she intends to continue a normal phone conversation using the AG 3. FIG. 1B shows the same handsfree system as that of FIG. 1A, in which the voice channel 6 is disconnected and lost as described above and the flow of a voice signal is switched by the switching unit 38.

According to the first embodiment of the present invention, a connection between the AG 3 and mobile communication network 1 is maintained by recognizing that the voice channel 6 is disconnected by the AG 3. A handsfree phone conversation can thus smoothly be shifted to a normal phone conversation.

Second Embodiment

Figure 3:
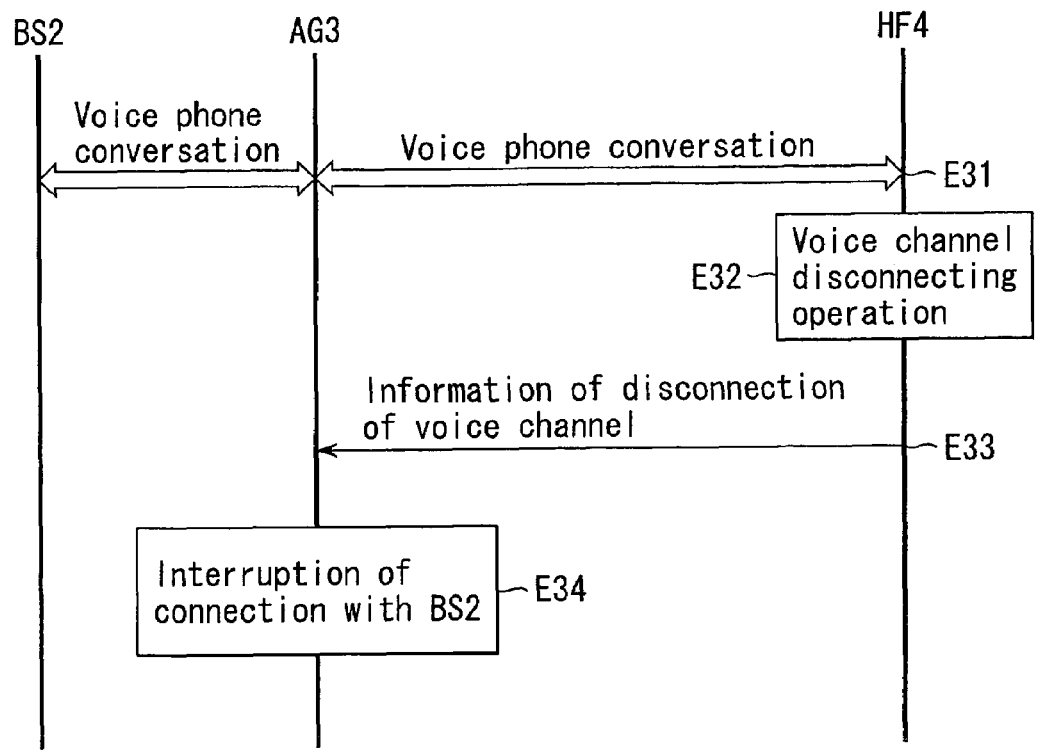
FIG. 3 is a sequence chart of an operation of a handsfree system according to a second embodiment of the present invention.

An operation of a handsfree system according to a second embodiment of the present invention will now be described with reference to FIG. 3. FIG. 3 is a sequence chart of the operation of the handsfree system according to the second embodiment. The configuration of the handsfree system is the same as that of the handsfree system according to the first embodiment. Please see FIGS. 1A and 1B when necessary.

First, assume that a handsfree voice phone conversation using the HF 4 is performed through the AG 3 and BS 2 (event E31). In this case, voice is transmitted between the AG short-range communication unit 39 and HF short-range communication unit 41 through the voice channel 6, and control signals are transferred therebetween through the data channel 5 in a steady-state manner. Under these conditions, the HF 4 operates to disconnect the voice channel 6 (event E32). The event E32 corresponds to the operation of stopping the engine of an automobile, turning off the HF 4, or disconnecting the voice channel 6 in the HF operation unit 45. Though the voice channel 6 is disconnected, it is not uniquely defined whether the voice channel 6 is disconnected by a normal procedure or with a link loss with no procedures, as described in the above Background of the Invention.

When the voice channel 6 is disconnected by a normal procedure, the HF shortrange communication unit 41 transmits a control signal indicative of the disconnection of the voice channel 6 to the AG shortrange communication unit 39 through the data channel 5. The channel disconnection detecting unit 301 detects that the voice channel 6 is disconnected from the HF 4 by the normal procedure as the AG shortrange communication unit 39 receives the control signal.

On the other hand, when the voice channel 6 is disconnected with a link loss, the above steady-state transfer of control signals as well as the transmission of voice is lost. The channel disconnection detecting unit 301 detects that the voice channel 6 is disconnected from the HF 4 with a link loss when the AG short-range communication unit 39 does not receive a reception signal from the short-range communication unit 41 even after a lapse of a predetermined period of time in response to a control signal sent to the unit 41 from the unit 39.

FIG. 3 shows the following. When the AG short-range communication unit 39 receives a control signal indicative of disconnection of the voice channel 6 from the HF short-range communication unit 41 or does not receive any reception signal even after a lapse of a predetermined period of time, the unit 41 sends voice channel disconnection information to the AG short-range communication unit 39 (event E33).

The AG control unit 34 controls the modulation/demodulation unit 33 so as to disconnect the AG 3 from the BS 2 when the channel disconnection detecting unit 301 detects that the voice channel 6 is disconnected from the HF 4 normally or with a link loss as described above. The reason is as follows. The possibility that a user's disconnection of the voice channel 6 by operating the HF 4 or stopping the engine means his or her intention to end a phone conversation is considered to be strong. It is thus possible for the user to prevent a connection of the AG 3 with the BS 2 from being maintained and prevent the phone conversation from being charged without his or her knowing about it though the phone conversation is completed. The operation performed when the voice channel 6 is disconnected by the AG 3 is the same as that in the first embodiment.

According to the second embodiment, the AG 3 is disconnected from the BS 2 irrespective of whether the voice channel 6 is disconnected from the HF 4 normally or with a link loss. The disconnection of the AG 3 from the mobile communication network due to the end of a phone conversation in itself is therefore performed according to user's intention. The user need not confirm the disconnection each time a phone conversation is finished.

Third Embodiment

Figure 4:
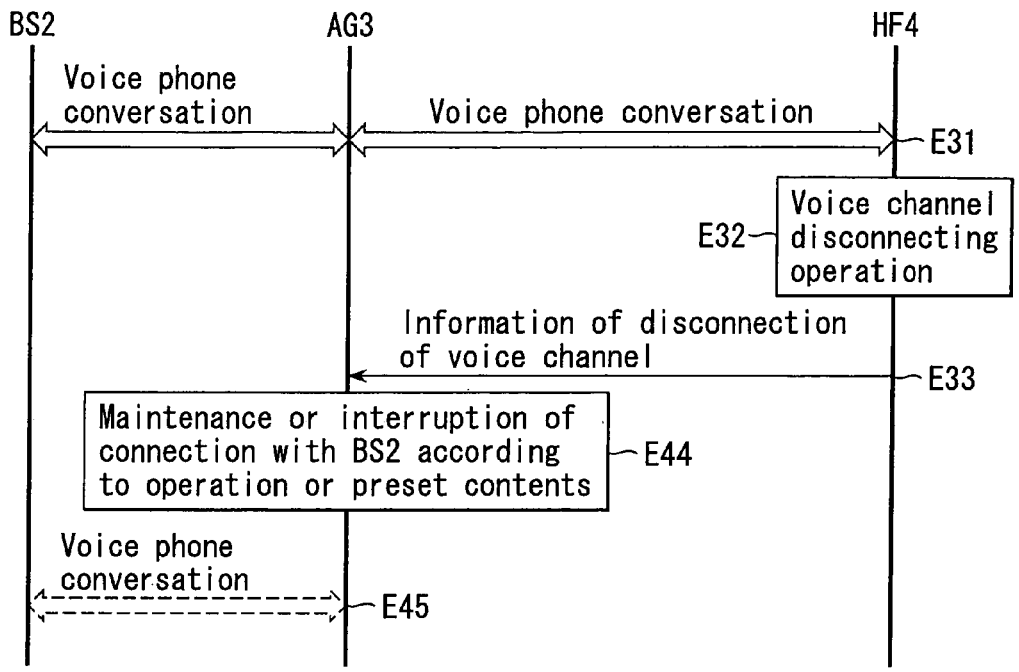
FIG. 4 is a sequence chart of an operation of a handsfree system according to a third embodiment of the present invention.

An operation of a handsfree system according to a third embodiment of the present invention will now be described with reference to FIG. 4. FIG. 4 is a sequence chart of the operation of the handsfree system according to the third embodiment. The configuration of the handsfree system is the same as that of the handsfree system according to the first and second embodiments. Please see FIGS. 1A and 1B when necessary.

Since the operations of events E31 to E33 in the third embodiment are the same as those in the second embodiment shown in FIG. 3, the same components as those of the second embodiment are denoted by the same reference numerals and their descriptions are omitted. As in the second embodiment, when the channel disconnection detecting unit 301 detects that the voice channel 6 is disconnected from the HF 4 normally or with a link loss, the AG control unit 34 displays, on the AG operation display unit 35, a request of a user to perform an input operation for maintaining or interrupting a connection of the AG 3 with the BS 2 (event E44). This aims at reconfirming user's intention to continue a phone conversation when the voice channel 6 is disconnected from the HF 4, unlike in the second embodiment. For example, a message that urges a user to perform an input operation can be displayed on the AG operation display unit 35 by flashing an indicating light.

In contrast, when the AG operation display unit 35 gives an instruction to maintain or interrupt a connection of the AG 3 with the BS 2, the AG control unit 34 controls the modulation/demodulation unit 33 for the maintenance or interruption. When the connection is maintained, the switching unit 38 performs a switching operation as in the first embodiment. Accordingly, the subsequent phone conversation is continued or finished (event E45).

The above connection with the BS 2 can be maintained or interrupted in accordance with the data preset by a user and stored in the AG control unit 34 (parenthesized in event E44). The operation carried out when the voice channel 6 is disconnected by the AG 3 is the same as that in the first embodiment.

According to the third embodiment, the connection with the BS 2 is maintained or interrupted according to user's intention irrespective of whether the voice channel 6 is disconnected from the HF 4 normally or with a link loss. The user's intention can thus be reflected more exactly.

Fourth Embodiment

Figure 5:
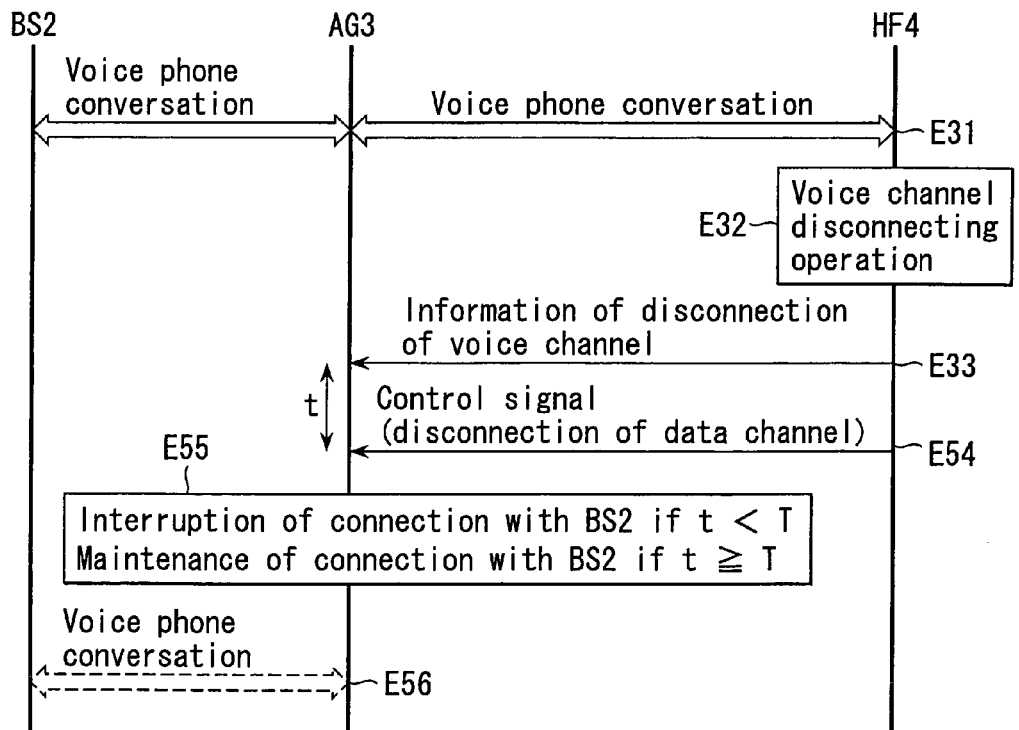
FIG. 5 is a sequence chart of an operation of a handsfree system according to a fourth embodiment of the present invention.

An operation of a handsfree system according to a fourth embodiment of the present invention will now be described with reference to FIG. 5. FIG. 5 is a sequence chart of the operation of the handsfree system according to the fourth embodiment. The configuration of the handsfree system is the same as that of the handsfree system according to the first to third embodiments. Please see FIGS. 1A and 1B when necessary.

Since the operations of events E31 to E33 in the fourth embodiment are the same as those in the embodiment shown in FIG. 3 or 4, the same components as those in FIG. 3 or 4 are denoted by the same reference numerals and their descriptions are omitted. In the fourth embodiment, when time t elapses from event E33, the HF short-range communication unit 41 sends out a control signal for disconnecting the data channel 5 to the AG short-range communication unit 39 (event E54). The channel disconnection detecting unit 301 compares time t between events E33 and E54 with a fixed value T. If t<T, the AG control unit 34 controls the modulation/demodulation unit 33 so as to interrupt a connection of the AG 3 with the BS 2. If t≧T, the AG control unit 34 controls the unit 33 so as to maintain the connection (event E55). When the connection is maintained, the switching unit 38 performs a switching operation as in the first embodiment. Consequently, the subsequent voice phone conversation is continued or finished (event E56).

The reason for the above control is as follows. The possibility that the fact that the voice channel 6 and data channel 5 are disconnected simultaneously or with a slight time difference implies user's intention to finish a phone conversation is considered to be strong, as is the possibility that the fact that they are disconnected with somewhat greater time difference implies user's intention to continue a phone conversation. The operation carried out when the voice channel 6 is disconnected by the AG 3 is the same as that in the first embodiment.

According to the fourth embodiment, a connection of the AG 3 with the BS 2 can easily and reliably be maintained or interrupted by user's intention represented by time difference from the disconnection of the voice channel to that of the data channel 5.

Fifth Embodiment

Figure 6:
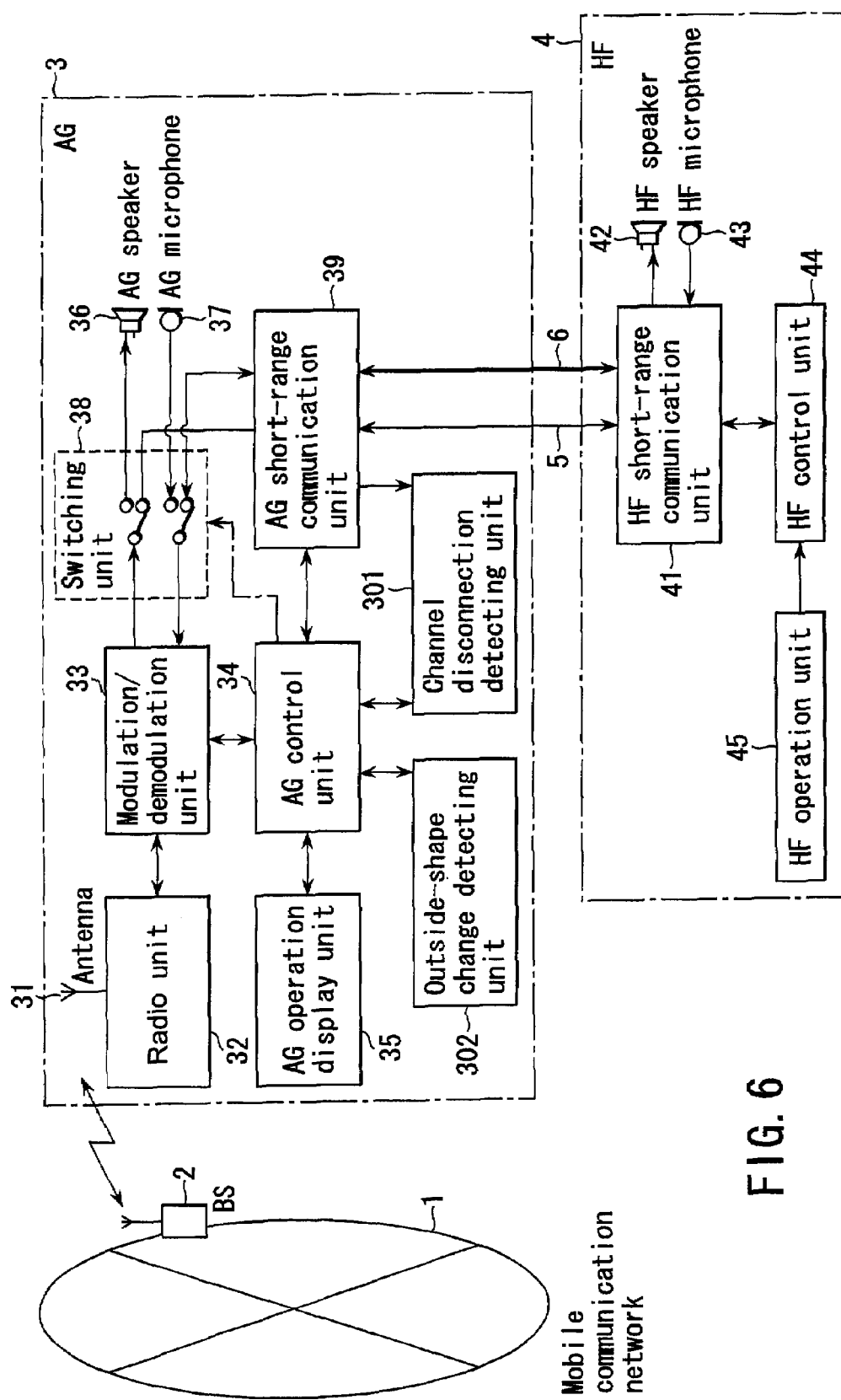
FIG. 6 is a block diagram of a handsfree system according to a fifth embodiment of the present invention.

An operation of a handsfree system according to a fifth embodiment of the present invention will now be described with reference to FIG. 6. FIG. 6 is a block diagram showing a configuration of the handsfree system according to the first embodiment together with the mobile communication network. The configuration shown in FIG. 6 is the same as that shown in FIG. 1A except that the AG 3 includes an outside-shape change detecting unit 302. The unit 302 detects that the outside shape of the AG 3 is not suitable for a voice phone conversation in normal status (e.g., when the AG 3 is of a foldable type, it is closed or it is opened at a given angle or less).

Figure 7:
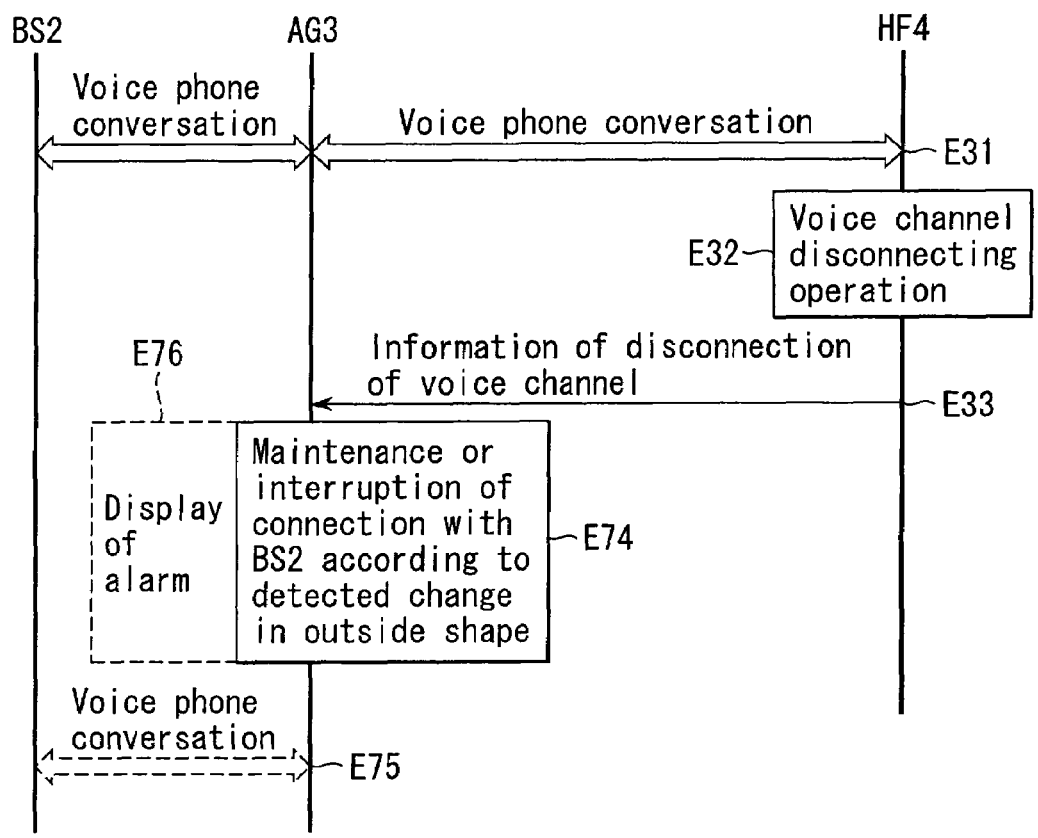
FIG. 7 is a sequence chart of an operation of the handsfree system according to the fifth embodiment of the present invention.

An operation of the handsfree system according to the fifth embodiment of the present invention will now be described with reference to FIG. 7. FIG. 7 is a sequence chart of the operation of the handsfree system according to the fifth embodiment.

Since the operations of events E31 to E33 in the fifth embodiment are the same as those in the second to fourth embodiments shown in FIGS. 3 to 5, the same components as those of the second to fourth embodiments are denoted by the same reference numerals and their descriptions are omitted. In the fifth embodiment, when the channel disconnection detecting unit 301 detects that the voice channel 6 is disconnected from the HF 4, the AG control unit 34 confirms, based on the detection result of the outside-shape change detecting unit 302, whether the outside shape of the AG 3 is suitable for a voice phone conversation in normal state. If the outside shape of the AG 3 is not suitable, the AG control unit 34 controls the modulation/demodulation unit 33 to interrupt a connection of the AG 3 with the BS 2. If the outside shape is suitable, the AG control unit 34 controls the unit 33 to maintain the connection (event E74). When the connection is maintained, the switching unit 38 performs a switching operation as in the first embodiment. Accordingly, the subsequent phone conversation is continued or finished (event E75).

When the outside-shape change detecting unit 302 detects that the outside shape of the AG 3 is not suitable for a voice phone conversation in normal state, the AG control unit 34 can display an alarm on the AG operation display unit 35 (event E76). By doing so, it is possible to confirm user's intention again to maintain or interrupt a connection with the BS 2 irrespective of the outside shape of the AG 3.

The fifth embodiment can be combined with the third or fourth embodiment. In other words, even though a user determines in the third or fourth embodiment that a connection of the AG 3 with the BS 2 should be maintained, he or she can decide whether to maintain the connection according to the outside shape of the AG 3. In either case, the operation carried out when the voice channel 6 is disconnected by the AG 3 is the same as that in the first embodiment.

The fifth embodiment has the following feature. A user can determine whether to maintain a connection of the AG 3 with the BS 2 in view of the outside shape of the AG 3. The advantage of the fifth embodiment can be added to that of the third or fourth embodiment.

According to the present invention described above in detail, it is possible to appropriately control the maintenance or interruption of a connection of the portable radio communication apparatus with the mobile communication network according to user's intention.

What is claimed is:

1. A portable radio communication apparatus comprising:
   a first communication unit to perform radio communication with a base station of a mobile communication network;
   a second communication unit to perform radio communication with a handsfree apparatus via a voice channel and a data channel;
   a mode switching unit to switch an operation mode between a first mode and a second mode, wherein the first mode enables a phone conversation using a microphone and a speaker of the portable radio communication apparatus, and wherein the second mode enables the phone conversation using the handsfree apparatus by transmitting voice data received from the base station through the first communication unit to the handsfree apparatus through the second communication unit and by transmitting voice data received from the handsfree apparatus through the second communication unit to the base station through the first communication unit;
   a detecting unit to detect a disconnection of the voice channel during the phone conversation in the second mode set by the mode switching unit;
   a time counting unit to count an elapsed time from when the disconnection of the voice channel is detected by the detecting unit; and
   a control unit to perform control to end the phone conversation when the control unit receives a control signal indicating a disconnection of the data channel from the handsfree apparatus before the elapsed time counted by the time counting unit exceeds a fixed value, and to perform control to continue the phone conversation by controlling the mode switching unit to switch the operation mode to the first mode when the control unit does not receive the control signal indicating the disconnection of the data channel from the handsfree apparatus before the elapsed time counted by the time counting unit exceeds the fixed value.

2. The portable radio communication apparatus according to claim 1, wherein the second communication unit comprises a shortrange communication device to perform short range communication with the handsfree apparatus.

3. The portable radio communication apparatus according to claim 1, wherein the handsfree apparatus is adapted to be provided in an automobile.

4. A portable radio communication apparatus having an openable and closable body, the portable radio communication apparatus comprising:
- a first communication unit to perform radio communication with a base station of a mobile communication network;
- a second communication unit to perform radio communication with a handsfree apparatus via a voice channel and a data channel;
- a mode switching unit to switch an operation mode between a first mode and a second mode, wherein the first mode enables a phone conversation using a microphone and a speaker of the portable radio communication apparatus, and wherein the second mode enables the phone conversation using the handsfree apparatus by transmitting voice data received from the base station through the first communication unit to the handsfree apparatus through the second communication unit and by transmitting voice data received from the handsfree apparatus through the second communication unit to the base station through the first communication unit;
- a first detecting unit to detect a disconnection of the voice channel during the phone conversation in the second mode set by the mode switching unit;
- a second detecting unit to detect one of an opened state and a closed state of the portable radio communication apparatus; and
- a control unit to perform control to continue the phone conversation by controlling the mode switching unit to switch the operation mode to the first mode when the first detecting unit detects the disconnection of the radio communication and the second detecting unit detects the opened state, and to perform control to end the phone conversation when the first detecting unit detects the disconnection of the radio communication and the second detecting unit detects the closed state.

5. The portable radio communication apparatus according to claim 4, wherein the second communication unit comprises a shortrange communication device to perform short-range communication with the handsfree apparatus.

6. The portable radio communication apparatus according to claim 4, wherein the handsfree apparatus is adapted to be provided in an automobile.

7. A handsfree communication control method for a portable radio communication apparatus including a first communication unit to perform radio communication with a base station of a mobile communication network, and a second communication unit to perform radio communication with a handsfree apparatus via a voice channel and a data channel, the method comprising:
- switching an operation mode between a first mode and a second mode, wherein the first mode enables a phone conversation using a microphone and a speaker of the portable radio communication apparatus, and wherein the second mode enables the phone conversation using the handsfree apparatus by transmitting voice data received from the base station through the first communication unit to the handsfree apparatus through the second communication unit and by transmitting voice data received from the handsfree apparatus through the second communication unit to the base station through the first communication unit;
- detecting a disconnection of the voice channel during the phone conversation in the second mode;
- counting an elapsed time from when the disconnection of the voice channel is detected; and
- performing control to end the phone conversation when the portable radio communication apparatus receives a control signal indicating a disconnection of the data channel from the handsfree apparatus before the counted elapsed time exceeds a fixed value, and performing control to continue the phone conversation by switching the operation mode to the first mode when the portable radio communication apparatus does not receive the control signal indicating the disconnection of the data channel from the handsfree apparatus before the counted elapsed time exceeds the fixed value.

8. The handsfree communication control method according to claim 7, wherein the second communication unit performs short-range communication with the handsfree apparatus.

9. The handsfree communication control method according to claim 7, wherein the handsfree apparatus is provided in an automobile.

* * * * *